US 9,909,871 B2

(12) United States Patent
Kumagai et al.

(10) Patent No.: US 9,909,871 B2
(45) Date of Patent: Mar. 6, 2018

(54) SURVEYING INSTRUMENT (71) Applicant: TOPCON Corporation, Tokyo-to (JP)

(72) Inventors: Kaoru Kumagai, Tokyo-to (JP);
Ken-ichiro Yoshino, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 90 days.

(21) Appl. No.: 15/158,631

(22) Filed: May 19, 2016

(65) Prior Publication Data

US 2016/0349051 A1    Dec. 1, 2016

(30) Foreign Application Priority Data

May 28, 2015   (JP) .................................. 2015-108590

(51) Int. Cl.
*G01C 15/00*   (2006.01)
*G01S 17/02*   (2006.01)
(Continued)

(52) U.S. Cl.
CPC ......... *G01C 15/008* (2013.01); *G01C 15/002* (2013.01); *G01S 7/4813* (2013.01);
(Continued)

(58) Field of Classification Search
CPC ...... G01C 15/002; G01C 15/004; G01C 3/08; G01C 15/006; G01C 15/008; G01C 1/04; G01C 15/105; G01S 7/4817
(Continued)

(56) References Cited

U.S. PATENT DOCUMENTS 5,784,155 A * 7/1998 Ohtomo ............... G01C 15/004
                                                    356/141.1
5,946,087 A * 8/1999 Kasori ................. G01C 15/004
                                                    356/139.1
(Continued)

FOREIGN PATENT DOCUMENTS

EP        2489980 A2    8/2012
EP        2775257 A1    9/2014
(Continued)

OTHER PUBLICATIONS

European communication dated Oct. 27, 2016 in corresponding European patent application No. 16169403.9.
(Continued)

*Primary Examiner* — Yaritza Guadalupe-McCall
(74) *Attorney, Agent, or Firm* — Nields, Lemack & Frame, LLC (57) ABSTRACT

The invention provides a surveying instrument, which comprises a horizontal rotating unit and a measuring unit installed on the horizontal rotating unit, wherein the horizontal rotating unit comprises a driving unit for rotating the measuring unit, a horizontal angle detector for measuring horizontal angle data, a first synchronization data generating unit, a first storage unit and a first control unit, the first control unit associates the horizontal angle data with the first synchronization data and stores in the first storage unit, wherein the measuring unit comprises a distance measuring unit for performing a distance measurement, a vertical angle detector for detecting a vertical angle at a time of distance measurement, a second synchronization data generating unit, a second storage unit and a second control unit, the second synchronization data generating unit outputs second synchronization data which indicate timings of a time of acquisition of the distance measurement data and a time of acquisition of the vertical angle data, the second control unit
(Continued)

associates the two-dimensional measurement data with the second synchronization data and stores in the second storage unit, and the horizontal angle data and the two-dimensional measurement data can be converted to three-dimensional data based on the first synchronization data and the second synchronization data.

14 Claims, 4 Drawing Sheets

(51) Int. Cl.
    *G01S 17/42*     (2006.01)
    *G01S 7/481*     (2006.01)

(52) U.S. Cl.
    CPC .......... *G01S 7/4817* (2013.01); *G01S 17/023* (2013.01); *G01S 17/42* (2013.01)

(58) Field of Classification Search
    USPC .......................................................... 33/281
    See application file for complete search history.

(56) References Cited

U.S. PATENT DOCUMENTS

| | | | | |
|---|---|---|---|---|
| 6,011,613 A * | 1/2000 | Ohtomo | ............... | G01C 15/004 356/139.07 |
| 6,249,338 B1 * | 6/2001 | Ohtomo | ............... | G01C 15/004 356/139.07 |
| 7,433,028 B2 * | 10/2008 | Kumagai | ............. | G01C 15/004 356/139.03 |
| 2002/0092185 A1 * | 7/2002 | Wu | ....................... | G01C 15/004 33/281 |
| 2007/0103672 A1 * | 5/2007 | Kumagai | ............. | G01C 15/004 356/139.03 |
| 2008/0075326 A1 | 3/2008 | Otani et al. | | |
| 2009/0119050 A1 * | 5/2009 | Hayashi | ................. | G01C 11/06 702/94 |
| 2009/0133273 A1 * | 5/2009 | Westermark | ......... | G01C 15/002 33/281 |
| 2012/0166137 A1 | 6/2012 | Grässer et al. | | |
| 2012/0249997 A1 * | 10/2012 | Matsumoto | ........... | G01S 7/4817 356/4.01 |
| 2015/0042977 A1 | 2/2015 | Siercks et al. | | |
| 2016/0349050 A1 * | 12/2016 | Yoshino | ............... | G01C 15/008 |
| 2016/0349051 A1 * | 12/2016 | Kumagai | ............. | G01C 15/002 |

FOREIGN PATENT DOCUMENTS

| | | |
|---|---|---|
| JP | 2008-82707 A | 4/2008 |
| WO | 2015/006526 A1 | 1/2015 |

OTHER PUBLICATIONS

The Kellogg Report, "How Does Robotic Positioning Work," Dec. 1, 2010, http://kelloggreport.com/how-does-a-Robotic-Total-Station-work.html.

European communication dated Nov. 7, 2016 in co-pending European patent application No. 16169389.0.

Notice of allowance dated Dec. 6, 2017 in co-pending U.S. Appl. No. 15/158,629.

\* cited by examiner

SURVEYING INSTRUMENT

BACKGROUND OF THE INVENTION

The present invention relates to a surveying instrument, by which it is possible to perform measurements in different modes of measurement such as a measurement of a point to be measured or an acquisition of a point cloud data of an object to be measured, and the like.

Conventionally, a total station is used in a case where a measurement of a point to be measured is performed and a laser scanner is used in a case where a shape of an object to be measured is to be determined. The laser scanner determines the shape of the object to be measured as a group of innumerable points with coordinates.

Since measurement methods of the total station and the laser scanner are different, the surveying instruments do not have interchangeability, and a total station or a laser scanner was necessary, corresponding to each of the case where measurement of a point to be measured is performed or the case where measurement of a shape of the object to be measured is performed, respectively.

Therefore, a plurality of surveying instruments are necessary and an equipment cost becomes expensive. In particular, a laser scanner is an expensive device and much burden in terms of cost has been required to equip.

SUMMARY OF THE INVENTION

It is an object of the present invention to provide a surveying instrument for measuring a point to be measured or for acquiring a point cloud data of an object to be measured, in which a structure of the instrument is simplified and contribute to a decrease of cost.

To attain the object as described above, a surveying instrument according to the present invention comprises a horizontal rotating unit and a measuring unit installed on the horizontal rotating unit, wherein the horizontal rotating unit comprises a driving unit for rotating the measuring unit, a horizontal angle detector for measuring horizontal angle data, a first synchronization data generating unit, a first storage unit and a first control unit, wherein the first synchronization data generating unit outputs first synchronization data which indicate a timing at a time of acquisition of the horizontal angle data of the horizontal angle detector, the first control unit associates the horizontal angle data with the first synchronization data and stores in the first storage unit, wherein the measuring unit comprises a distance measuring unit for performing a distance measurement, a vertical angle detector for detecting a vertical angle at a time of distance measurement, a second synchronization data generating unit, a second storage unit and a second control unit, wherein the measuring unit acquires two-dimensional measurement data based on distance measurement data by the distance measuring unit and vertical angle data by the vertical angle detector, the second synchronization data generating unit outputs second synchronization data which indicate timings of a time of acquisition of the distance measurement data and a time of acquisition of the vertical angle data, the second control unit associates the two-dimensional measurement data with the second synchronization data and stores in the second storage unit, and the horizontal angle data and the two-dimensional measurement data can be converted to three-dimensional data based on the first synchronization data and the second synchronization data.

Further, in the surveying instrument according to the present invention, each of the horizontal rotating unit and the measuring unit have GPS devices respectively, and the first synchronization data generating unit and the second synchronization data generating unit output the first synchronization data and the second synchronization data based on timing signals as obtained from the GPS devices.

Further, in the surveying instrument according to the present invention, each of the first control unit and the second control unit respectively have clocks which issue timing signals for control signal, either one of the first control unit and the second control unit outputs the control signal to the other of the first control unit and the second control unit and the first synchronization data and the second synchronization data are adapted to be synchronized based on the control signal.

Further, in the surveying instrument according to the present invention, the horizontal rotating unit has a leveling unit, the measuring unit has a tilt sensor for detecting tilting in two horizontal directions, and a mounting condition of the measuring unit with respect to the horizontal rotating unit is corrected so that the tilt sensor detects a horizontality under a condition where the horizontal rotating unit is leveled horizontally by the leveling unit.

Further, in the surveying instrument according to the present invention, the measuring unit is a two-dimensional scanner unit, wherein the two-dimensional scanner unit comprises a distance measuring unit which emits a pulsed distance measuring light and performs a distance measurement for each of the pulsed distance measuring light, a scanning mirror provided on a vertical rotation shaft having a horizontal axis and for rotatably irradiating the pulsed distance measuring light, a motor for rotating the vertical rotation shaft and a vertical angle detector for detecting a vertical angle of the vertical rotation shaft, wherein the measuring unit is configured so as to acquire two-dimensional point cloud data based on a distance measurement result of the distance measuring unit and on a vertical angle at a time of distance measurement as detected by the vertical angle detector.

Further, in the surveying instrument according to the present invention, the measuring unit is a sighting distance measuring unit, wherein the sighting distance measuring unit has a telescope unit capable of rotating in a vertical direction, a motor for rotating the telescope unit in a vertical direction, and a vertical angle detector for detecting a vertical angle of the telescope unit, wherein the telescope unit has a sighting telescope and a distance measuring unit, the distance measuring unit performs a distance measurement of a measuring point under a condition where a predetermined measuring point is sighted by the sighting telescope and the vertical angle detector measures a vertical angle of the sighting telescope under a sighted condition, wherein the measuring unit is configured so as to measure two-dimensional coordinates of the measuring point based on the distance measurement result and the vertical angle as detected.

Further, in the surveying instrument according to the present invention, an other measuring unit is further provided on the measuring unit, the measuring unit is the sighting distance measuring unit and the other measuring unit is the two-dimensional scanner unit.

Furthermore, in the surveying instrument according to the present invention, the horizontal rotating unit is a horizontal rotating mechanism unit as provided on a total station and the two-dimensional scanner unit is installed on the horizontal rotating mechanism unit.

According to the present invention, the surveying instrument comprises a horizontal rotating unit and a measuring unit installed on the horizontal rotating unit, wherein the horizontal rotating unit comprises a driving unit for rotating the measuring unit, a horizontal angle detector for measuring horizontal angle data, a first synchronization data generating unit, a first storage unit and a first control unit, wherein the first synchronization data generating unit outputs first synchronization data which indicate a timing at a time of acquisition of the horizontal angle data of the horizontal angle detector, the first control unit associates the horizontal angle data with the first synchronization data and stores in the first storage unit, wherein the measuring unit comprises a distance measuring unit for performing a distance measurement, a vertical angle detector for detecting a vertical angle at a time of distance measurement, a second synchronization data generating unit, a second storage unit and a second control unit, wherein the measuring unit acquires two-dimensional measurement data based on distance measurement data by the distance measuring unit and vertical angle data by the vertical angle detector, the second synchronization data generating unit outputs second synchronization data which indicate timings of a time of acquisition of the distance measurement data and a time of acquisition of the vertical angle data, the second control unit associates the two-dimensional measurement data with the second synchronization data and stores in the second storage unit, and the horizontal angle data and the two-dimensional measurement data can be converted to three-dimensional data based on the first synchronization data and the second synchronization data. As a result, an acquisition of the horizontal angle data by the horizontal rotating unit and an acquisition of the two-dimensional measurement data by the measuring unit can be performed individually, giving and taking of data between the horizontal rotating unit and the measuring unit can be omitted and a circuit arrangement can be simplified, and further, a separation of the horizontal rotating unit from the measurement unit can be easily accomplished and an exchanging of the measurement units become possible.

Further, according to the present invention, in the surveying instrument, each of the horizontal rotating unit and the measuring unit have GPS devices respectively, and the first synchronization data generating unit and the second synchronization data generating unit output the first synchronization data and the second synchronization data based on timing signals as obtained from the GPS devices. As a result, the association between the horizontal angle data obtained by the horizontal rotating unit and the two-dimensional measurement data obtained by the measuring unit can be easily accomplished, and it is possible to convert to three-dimensional data based on both the data.

Further, according to the present invention, in the surveying instrument, each of the first control unit and the second control unit respectively have clocks which issue timing signals for control signal, either one of the first control unit and the second control unit outputs the control signal to the other of the first control unit and the second control unit and the first synchronization data and the second synchronization data are adapted to be synchronized based on the control signal. As a result, the association between the horizontal angle data obtained by the horizontal rotating unit and the two-dimensional measurement data obtained by the measuring unit can be easily accomplished, and it is possible to convert to three-dimensional data based on both the data.

Further, according to the present invention, in the surveying instrument, the horizontal rotating unit has a leveling unit, the measuring unit has a tilt sensor for detecting tilting in two horizontal directions, and a mounting condition of the measuring unit with respect to the horizontal rotating unit is corrected so that the tilt sensor detects a horizontality under a condition where the horizontal rotating unit is leveled horizontally by the leveling unit. As a result, an accuracy of the two-dimensional measurement data as acquired by the measuring unit is guaranteed.

Further, according to the present invention, in the surveying instrument, the measuring unit is a two-dimensional scanner unit, wherein the two-dimensional scanner unit comprises a distance measuring unit which emits a pulsed distance measuring light and performs a distance measurement for each of the pulsed distance measuring light, a scanning mirror provided on a vertical rotation shaft having a horizontal axis and for rotatably irradiating the pulsed distance measuring light, a motor for rotating the vertical rotation shaft and a vertical angle detector for detecting a vertical angle of the vertical rotation shaft, wherein the measuring unit is configured so as to acquire two-dimensional point cloud data based on a distance measurement result of the distance measuring unit and on a vertical angle at a time of distance measurement as detected by the vertical angle detector. As a result, the surveying instrument can be used as a three-dimensional laser scanner.

Further, according to the present invention, in the surveying instrument, the measuring unit is a sighting distance measuring unit, wherein the sighting distance measuring unit has a telescope unit capable of rotating in a vertical direction, a motor for rotating the telescope unit in a vertical direction, and a vertical angle detector for detecting a vertical angle of the telescope unit, wherein the telescope unit has a sighting telescope and a distance measuring unit, the distance measuring unit performs a distance measurement of a measuring point under a condition where a predetermined measuring point is sighted by the sighting telescope and the vertical angle detector measures a vertical angle of the sighting telescope under a sighted condition, wherein the measuring unit is configured so as to measure two-dimensional coordinates of the measuring point based on the distance measurement result and the vertical angle as detected. As a result, the surveying instrument can be used as a total station.

Further, according to the present invention, in the surveying instrument, an other measuring unit is further provided on the measuring unit, the measuring unit is the sighting distance measuring unit and the other measuring unit is the two-dimensional scanner unit. As a result, the measuring unit can be used as a total station or a three-dimensional laser scanner, corresponding to the measuring condition.

Furthermore, according to the present invention, in the surveying instrument, the horizontal rotating unit is a horizontal rotating mechanism unit as provided on a total station and the two-dimensional scanner unit is installed on the horizontal rotating mechanism unit. As a result, it is possible to add functions of the three-dimensional laser scanner to the existing total station.

DETAILED DESCRIPTION OF THE PREFERRED EMBODIMENT

A description will be given below on embodiments of the present invention by referring to the attached drawings.

First, referring to FIG. 1, a description will be given on a first embodiment.

The first embodiment shows a case when arranged as a surveying instrument 1 with a function of a laser scanner.

The surveying instrument 1 primarily comprises a leveling unit 2 mounted on a tripod (not shown), a horizontal rotating unit 3 provided on the leveling unit 2 and a measuring unit 4, which is removably installed on the horizontal rotating unit 3. In the first embodiment, the measuring unit 4 is designed as a two-dimensional scanner unit 4a.

The horizontal rotating unit 3 comprises a fixing unit 5, a horizontal rotating body 6, a horizontal rotation shaft 7, a horizontal rotation bearing 8, a horizontal rotating motor 9, a horizontal angle encoder 11 serving as a horizontal angle detector, a horizontal angle control unit 12, a first synchronization data generating unit 13, a first storage unit 14, etc.

The horizontal rotation bearing 8 is fixed on the fixing unit 5, the horizontal rotation shaft 7 is rotatably supported on the horizontal rotation bearing 8, the horizontal rotating body 6 is supported by the horizontal rotation shaft 7 and the horizontal rotating body 6 is arranged so as to rotate integrally with the horizontal rotation shaft 7.

Between the horizontal rotation bearing 8 and the horizontal rotating body 6, the horizontal rotating motor 9 is provided, the horizontal rotating motor 9 is controlled by the horizontal angle control unit 12, and it is arranged so that the horizontal angle control unit 12 is made to rotate the horizontal rotating body 6 around the horizontal rotation shaft 7 as the center, by the horizontal rotating motor 9.

A relative rotation displacement of the horizontal rotating body 6 with respect to the fixing unit 5 is detected by the horizontal angle encoder 11. A detection signal from the horizontal angle encoder 11 is inputted to the horizontal angle control unit 12, a horizontal angle detection data is calculated by the horizontal angle control unit 12, and a feedback-control with respect to the horizontal rotating motor 9 is performed by the horizontal angle control unit 12 based on the horizontal angle detection data.

Further, the horizontal angle detection data is associated with a first synchronization data as outputted by the first synchronization data generating unit 13 and is stored in the first storage unit 14. As the first storage unit 14, various memory means such as an HDD, a CD, a memory card, etc. are used, and the first storage unit 14 may be arranged so as to be removably provided with respect to the horizontal rotating unit 3 or so as to be capable of sending the data to an external storage device or an external data processing device via a communication means as required.

The two-dimensional scanner unit 4a is removably provided on an upper surface of the horizontal rotating unit 3 via a coupler 15.

The coupler 15 comprises a lower coupling element 15a to be fixed on the upper surface of the horizontal rotating unit 3 and an upper coupling element 15b to be fixed on a lower surface of the two-dimensional scanner unit 4a.

The coupler 15 has a coupling function and an alignment function. When the lower coupling element 15a and the upper coupling element 15b are fitted and coupled, an axis 7a of the horizontal rotation shaft 7 is coincided with a machine axis of the two-dimensional scanner unit 4a, and further, it is arranged so that the horizontal rotating unit 3 and the two-dimensional scanner unit 4a are rotated integrally.

Here, the machine axis is extended in a vertical direction and perpendicularly crosses an axis of a vertical rotation shaft 22 (to be described later) and passes a point where a distance measuring light (to be described later) enters a scanning mirror 24 (to be described later).

Further, the horizontal rotating unit 3 and the two-dimensional scanner unit 4a are electrically connected by a connector 16.

The connector 16 is designed in a separable structure and when the two-dimensional scanner unit 4a is mechanically mounted on the horizontal rotating unit 3, the two-dimensional scanner unit 4a and the horizontal rotating unit 3 are electrically connected.

Here, as the electrical connection, a contact or a non-contact connecting means such as an electrical contact, a capacitive coupling, an inductive coupling, a wireless means, etc. can be used.

The two-dimensional scanner unit 4a comprises a housing 19 with a recessed portion 18 formed at the center and component elements as given below, which are accommodated in the housing 19.

The component elements include a distance measuring unit 21, the vertical rotation shaft 22, a bearing 23, the scanning mirror 24, a scanning motor 25, a vertical angle encoder 26 as a vertical angle detector, a vertical angle control unit 27, a main control unit 28, an operation input unit 29, a display unit 31, a second synchronization data generating unit 32, a second storage unit 33, etc.

The vertical rotation shaft 22 is rotatably supported via the bearing 23. The vertical rotation shaft 22 has a horizontal axis 22a, one end portion is extended into the recessed portion 18 and the scanning mirror 24 is fixed on the one end portion. Further, on an other end portion of the vertical rotation shaft 22, the vertical angle encoder 26 is provided. The scanning motor 25 rotates the vertical rotation shaft 22 and the scanning mirror 24 is rotated around the horizontal axis as the center, by the rotation of the vertical rotation shaft 22.

Further, it is so arranged that the axis 7a and the axis 22a cross perpendicularly to each other on a reflection surface of the scanning mirror 24.

Rotation displacement of the scanning mirror 24 is detected by the vertical angle encoder 26 and the detection result is inputted to the vertical angle control unit 27. The vertical angle control unit 27 calculates a vertical angle data of the scanning mirror 24 based on the detection result and feedback-controls the scanning motor 25 based on the vertical angle data.

A description will be given on the distance measuring unit 21.

A distance measuring light of a pulsed light is emitted from a light emitting element 35 and the distance measuring light is projected via a light projecting optical system 36 and a beam splitter 37. An optical axis of the distance measuring light as projected from the beam splitter 37 is coincided with the axis 22a and the distance measuring light is deflected at a right angle by the scanning mirror 24. By a rotation of the scanning mirror 24, the distance measuring light is rotated (scanned) within a plane perpendicularly crossing the axis 22a and including the axis 7a.

The distance measuring light (hereinafter referred as a "reflected distance measuring light") as reflected by the object to be measured enters the scanning mirror 24, is deflected by the scanning mirror 24 and is received by a photodetection element 39 via the beam splitter 37 and the photodetection optical system 38.

The distance measurement control unit 41 executes a distance measurement for each one pulse of the distance measuring light based on a time difference (i.e. a round time of the pulsed light) between a light emission timing of the light emission element 35 and a photodetection timing of the photodetection element 39.

It is to be noted that in the figure, reference numeral 42 denotes an internal reference optical system and a distance measurement can be accomplished with high accuracy by performing a distance measurement by a time difference between the photodetection timing of the distance measuring light as received via the internal reference optical system 42 and the photodetection timing of the reflected distance measuring light.

By performing a distance measurement while rotating the scanning mirror 24 in a vertical direction, a vertical angle data and a distance measurement data are acquired and a two-dimensional point cloud data can be acquired based on the vertical angle data and the distance measuring data.

The vertical angle data as calculated by the vertical angle control unit 27 and the distance measurement data as measured by the distance measuring unit 21 are transmitted to the second storage unit 33 by a control signal from the main control unit 28. In the second storage unit 33, the vertical angle data and the distance measurement data are associated with the second synchronization data from the second synchronization data generating unit 32, and are stored.

It is so arranged that the vertical angle data as outputted from the vertical angle control unit 27 is synchronized with the light emission time as measured by the distance measuring unit 21 and outputted.

Similarly to the first storage unit 14, various memory means such as a HDD, a CD, a memory card, etc. are used in the second storage unit 33 and the second storage unit 33 may be arranged as removable to the two-dimensional scanner unit 4a or is capable of sending the data to an external storage unit via a communication means as required.

The operation input unit 29 has an input key and an information or a data necessary for the measurement are inputted to the main control unit 28 from the operation input unit 29. On the display unit 31, an input information or a measurement condition or the like from the operation input unit 29 are displayed. It is to be noted that the operation input unit 29 may be designed as a touch panel and may be used simultaneously as the display unit. In this case, the display unit 31 is omitted. The main control unit 28 corresponds to the input information and the data from the operation input unit 29, transmits control signals to the vertical angle control unit 27 and the distance measuring unit 21 and transmits a control signal to the horizontal angle control unit 12 via the connector 16.

Thus, the main control unit 28 performs control for a point cloud data acquisition of the two-dimensional scanner unit 4a and performs control of the horizontal rotating unit 3. By cooperative operation of the scanning in a vertical direction by the two-dimensional scanner unit 4a and the rotation in a horizontal direction of the horizontal rotating unit 3, two-dimensional (two directions, i.e. horizontal and vertical) scanning is executed. By the two-dimensional scanning, the vertical angle data, the horizontal angle data and the distance measurement data can be acquired, and a three-dimensional point cloud data corresponding to a surface of the object to be measured can be acquired.

For the measurement data as acquired by cooperative operation of the two-dimensional scanner unit 4a and the horizontal rotating unit 3, the measurement data (hereinafter referred as a "first measurement data") relating to a horizontal rotation are stored in the first storage unit 14, and the measurement data (hereinafter referred as a "second measurement data") as acquired by the two-dimensional scanner unit 4a are stored in the second storage unit 33 respectively.

Further, the first measurement data as stored in the first storage unit 14 are associated with the first synchronization data from the first synchronization data generating unit 13, and the second measurement data as stored in the second storage unit 33 are associated with the second synchronization data from the second synchronization data generating unit 32.

An integration of the first measurement data and the second measurement data is performed based on the first synchronization data and the second synchronization data.

Next, a description will be given on the first synchronization data generating unit 13 and the second synchronization data generating unit 32.

The first synchronization data generating unit 13 and the second synchronization data generating unit 32 are for preparing a synchronized data in order to coincide the data of a horizontal rotation (horizontal angle) as acquired by the horizontal rotating unit 3 and a two-dimensional measurement data as acquired by the two-dimensional scanner unit 4a, in terms of time.

As a first method for preparing the synchronized data, a GPS receiver (not shown) is provided on the horizontal rotating unit 3 and the two-dimensional scanner unit 4a respectively. A GPS week and a GPS time as obtained from the GPS receiver and a clock using a 1PPS signal are provided on the horizontal rotating unit 3 and the two-dimensional scanner unit 4a respectively. The first synchronization data generating unit 13 and the second synchronization data generating unit 32 obtain the GPS week, the GPS time and the 1PPS signal from the GPS receiver respectively as a time signal (timing signal), and a timing signal including a date and a time data (timing data) are outputted as a synchronized data.

Further as a second method, each of the horizontal angle control unit 12 and the main control unit 28 respectively has a clock signal generator for issuing a control signal for a control. Therefore, each of the horizontal angle control unit 12 and the main control unit 28 respectively has a clock based on a clock signal issued by the clock signal generator.

Each of the first synchronization data generating unit 13 and the second synchronization data generating unit 32 outputs a synchronization signal based on a timing signal as obtained from each of the clocks respectively.

The synchronization signal is transmitted to the main control unit 28 from the clock of the horizontal rotating unit 3 via the connector 16 and the main control unit 28 synchronizes the clock of the two-dimensional scanner unit 4a with the clock of the horizontal rotating unit 3. The first synchronization data generating unit 13 and the second synchronization data generating unit 32 outputs a date of synchronization and the timing data as the synchronized data.

Further, it may be so arranged that a clock is provided in each of the horizontal rotating unit 3 and the two-dimensional scanner unit 4a respectively, a synchronization signal is sent to the horizontal angle control unit 12 from the clock of the two-dimensional scanner unit 4*a* via the connector 16, the horizontal angle control unit 12 may be configured so as to synchronize the clock of the horizontal rotating unit 3 with the clock of the two-dimensional scanner unit 4*a* and output the date of synchronization and the timing data as the synchronization data from the first synchronization data generating unit 13 and the second synchronization data generating unit 32.

It is to be noted that although the synchronization data is described as a date and a time (i.e. timing), it would suffice if synchronized collation can be performed on a horizontal angle data as stored in the first storage unit 14, a vertical angle data as stored in the second storage unit 33 and a distance measurement data, or may be in a form of a synchronization data for exclusive use.

A description will be given below on an operation of the surveying instrument 1 as given above.

In a case where the surveying instrument 1 is used as a laser scanner, the two-dimensional scanner unit 4*a* is mounted on the horizontal rotating unit 3 via the coupler 15.

The coupler 15 mechanically integrates the horizontal rotating unit 3 with the two-dimensional scanner unit 4*a* and coincides a mechanical axis of the two-dimensional scanner unit 4*a* and a rotation axis of the horizontal rotating unit 3.

Further, by assembling the horizontal rotating unit 3 and the two-dimensional scanner unit 4*a*, the horizontal rotating unit 3 and the two-dimensional scanner unit 4*a* are electrically connected via the connector 16.

The control relating to the rotation of the horizontal rotating unit 3 is executed by the horizontal angle control unit 12, and the control of the two-dimensional scanner unit 4*a*, i.e. the control of distance measurement by the distance measuring unit 21 and the control of rotation of the scanning mirror 24, is executed by the main control unit 28. The main control unit 28 executes an integrated control of the horizontal rotating unit 3 and the two-dimensional scanner unit 4*a*.

Under a condition where the distance measuring light is emitted from the distance measuring unit 21, the scanning mirror 24 is vertically rotated around the vertical rotation shaft 22 as a center, by the scanning motor 25. Further, the horizontal rotating unit 3 is horizontally rotated by the horizontal rotating motor 9.

By a cooperative operation of the vertical rotation of the scanning mirror 24 and the horizontal rotation of the horizontal rotating unit 3, the distance measuring light is scanned in two directions, i.e. in vertical direction and in horizontal direction.

The distance measurement is performed for each one pulse of the distance measuring light and a vertical angle is detected for each one pulse. Also, a horizontal angle is detected at a pulse interval and at an interval where an interpolation can be sufficiently accomplished. By associating the distance measurement data, the vertical angle data and the horizontal angle data for each one pulse, a three-dimensional data of each measuring point can be acquired. Further, by scanning the distance measuring light two-dimensionally i.e. vertically and horizontally, a three-dimensional point cloud data can be acquired.

As described above, the horizontal angle data as acquired by the horizontal rotating unit 3 is stored in the first storage unit 14 and the distance measurement data and the vertical angle data as acquired by the two-dimensional scanner unit 4*a* are stored in the second storage unit 33.

Further, the first synchronization data as outputted from the first synchronization data generating unit 13 and the second synchronization data as outputted from the second synchronization data generating unit 32 are, for instance, a date and time moment data (timing data) as synchronized and the horizontal angle data, the distance measurement data and vertical angle data are associated based on the date and the timing data.

Therefore, the data as stored in the first storage unit 14 and the data as stored in the second storage unit 33 are taken out individually, inputted to an other external data processing device such as a PC, and the horizontal angle data, the distance measurement data and the vertical angle data can be converted to a three-dimensional data.

It is to be noted that it may be arranged in such a manner that after the completion of the measurement of the data as stored in the first storage unit 14, the data may be inputted to the second storage unit 33 and converted to a three-dimensional data by the main control unit 28.

As described above, the horizontal data as acquired by the horizontal rotating unit 3 and the two-dimensional data as acquired by the two-dimensional scanner unit 4*a* are designed to be stored individually in the first storage unit 14 and in the second storage unit 33 respectively, and since the giving and taking of the control signals between the horizontal rotating unit 3 and the two-dimensional scanner unit 4*a* are only synchronization signals to be given and taken via the connector 16, there is no need to associate a control system of the horizontal rotating unit 3 with a control system of the two-dimensional scanner unit 4*a*, and this makes it possible to simplify circuit arrangement.

As described above, the coupler 15, which is used to connect the horizontal rotating unit 3 with the two-dimensional scanner unit 4*a*, also has an alignment function which coincides the rotation axis of the horizontal rotation shaft 7 with the mechanical axis of the two-dimensional scanner unit 4*a*. However, in order to further improve a mechanical accuracy under a connected condition, an arrangement as described below may be added.

A tilt sensor (not shown) for detecting a tilt in two directions (i.e. in two horizontal directions), that is, a direction perpendicularly crossing the axis of the vertical rotation shaft 22 and a direction running in parallel to the axis of the vertical rotation shaft 22 are provided on the two-dimensional scanner unit 4*a*. The horizontal rotating unit 3 is leveled by the leveling unit 2 and the mounting condition of the two-dimensional scanner unit 4*a* is corrected so that the tilt sensor detects the horizontality under a condition where the leveling unit 2 is leveled, i.e. a condition where the horizontal rotation axis is vertical. By adjusting the two-dimensional scanner unit 4*a* to a horizontal condition, the two-dimensional scanner unit 4*a* and the horizontal rotating unit 3 are connected with each other while a highly accurate leveling condition is maintained.

The two-dimensional scanner unit 4*a* can be separated by using the coupler 15, and a measurement unit other than the two-dimensional scanner unit 4*a* can be mounted on the horizontal rotating unit 3.

In the first embodiment, it is so configured that the display unit 31, the operation input unit 29 and the main control unit 28 are arranged in the two-dimensional scanner unit 4*a*, while it may also be so configured that the display unit 31, the operation input unit 29 and the main control unit 28 are arranged in the horizontal rotating unit 3 and the control signals are sent to the vertical angle control unit 27 and the distance measuring unit 21 via the horizontal angle control unit 12 and the connector 16.

Further, in a case where the display unit 31, the operation input unit 29 and the main control unit 28 are provided on the horizontal rotating unit 3, the connector 16 may be omitted by providing an acceleration sensor on the two-dimensional scanner unit 4a, detecting a movement of the horizontal angle of the horizontal rotating unit 3 by the acceleration sensor of the two-dimensional scanner unit 4a and by controlling to start the measurement based on the detection result of the acceleration sensor.

It is to be noted that a camera is provided on the housing 19 of the two-dimensional scanner unit 4a or a camera, which photographs via the scanning mirror 24, is provided in the housing 19 and the image data as acquired by the camera, the vertical angle data at the time of image acquisition and the second synchronization data of the second synchronization data generating unit 32 are associated with each other and stored in the second storage unit 33. The horizontal angle data at the time of image data acquisition and the first synchronization data of the first synchronization data generating unit 13 are associated with each other and are stored in the first storage unit 14. The data as stored in the first storage unit 14 and the second storage unit 33 are transmitted to an external data processing device (not shown) such as a PC, via a recording medium (not shown) or the like. Then, the PC can produce a panoramic image by combining the horizontal angle data and the vertical angle data and the image data based on the first synchronization data and the second synchronization data and can add color informations of RGB to each of the coordinates of the point cloud data, which is an assembly of a coordinate data, based on this panoramic image.

Figure 2:
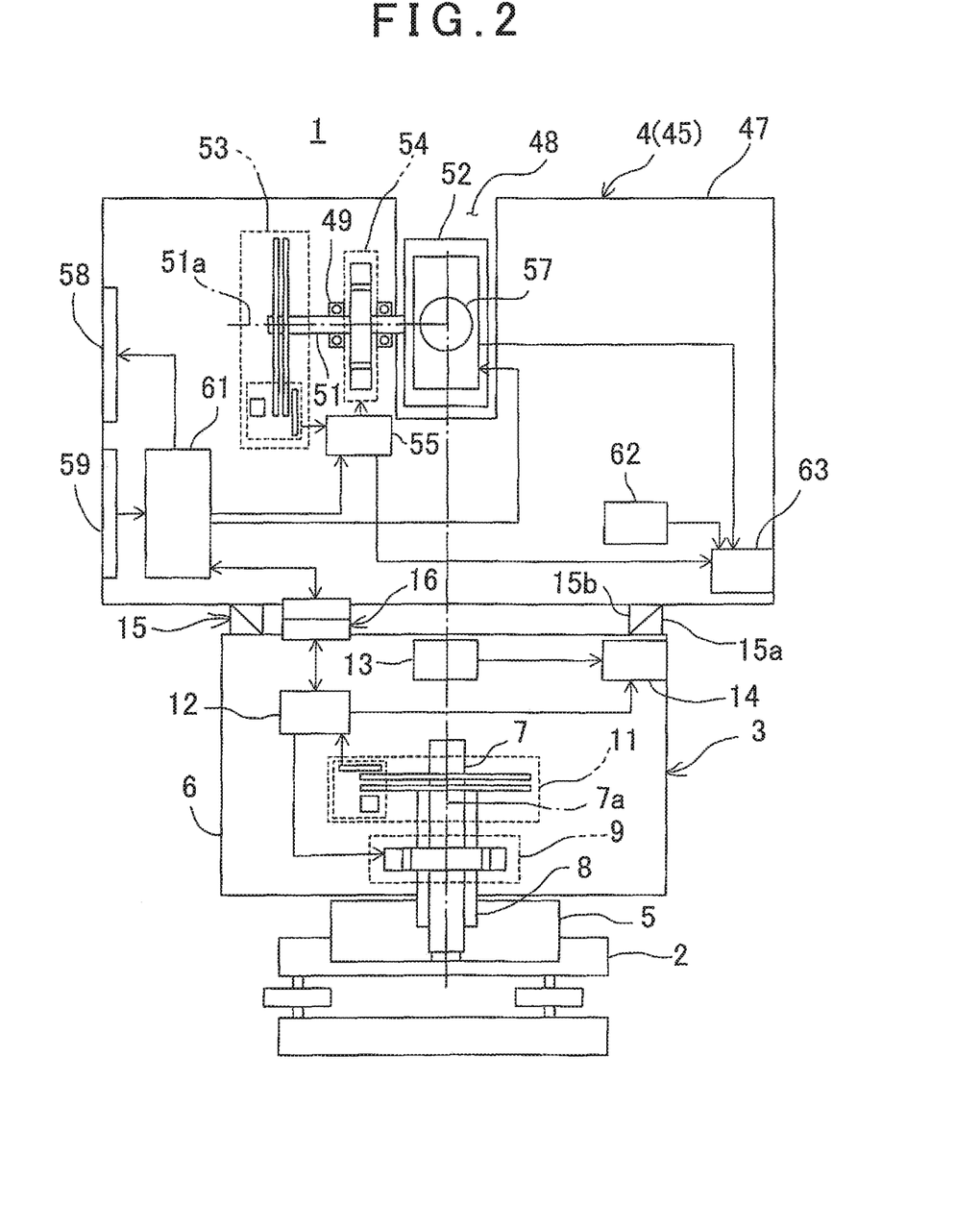
FIG. 2 is a schematical explanatory drawing of a surveying instrument according to a second embodiment of the present invention.

Referring to FIG. 2, a description will be given on a second embodiment.

The second embodiment shows a surveying instrument 1 which is constituted so as to have a function of a total station.

Figure 1:
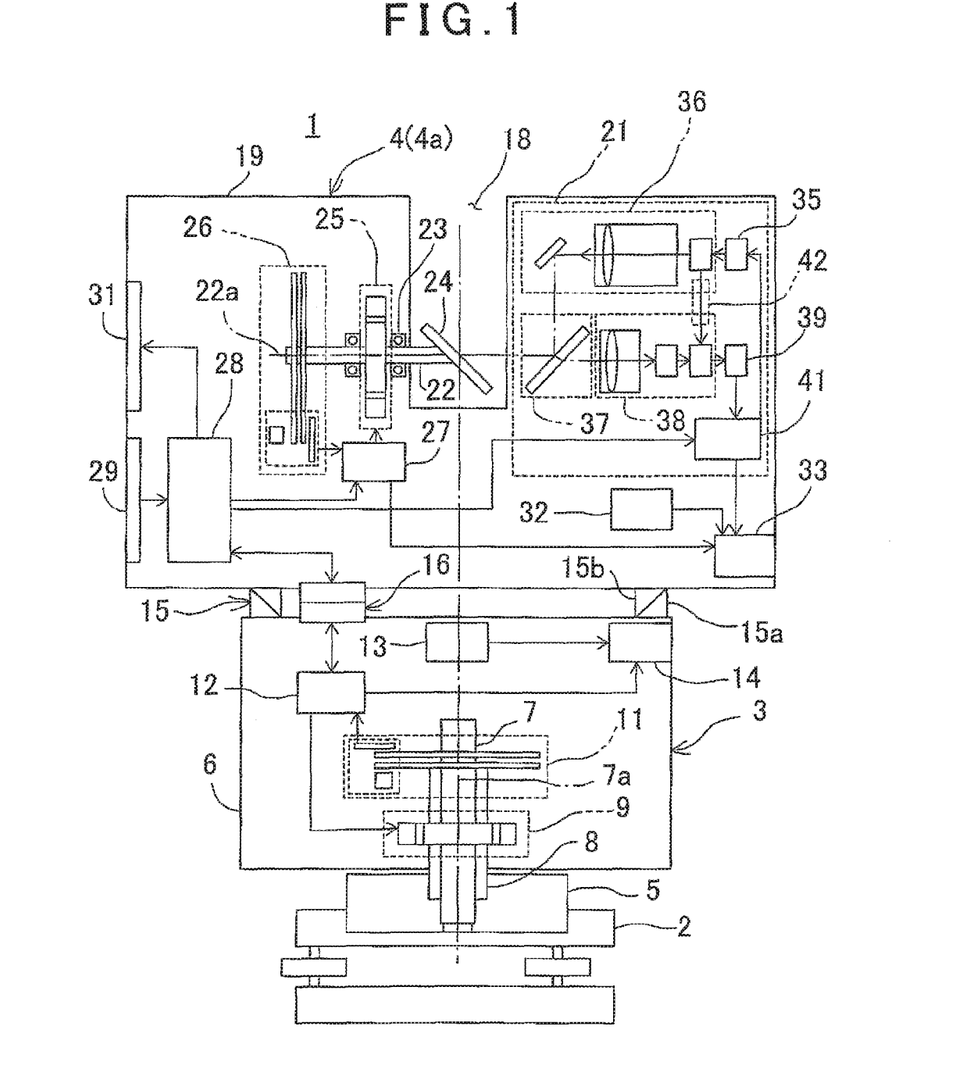
FIG. 1 is a schematical explanatory drawing of a surveying instrument according to a first embodiment of the present invention.

It is to be noted that in FIG. 2, what are equivalent to components as shown in FIG. 1 are referred by the same symbol, and detailed description thereof will be omitted.

On a horizontal rotating unit 3, a sighting distance measuring unit 45 is mounted as a measuring unit 4 via a coupler 15. The sighting distance measuring unit 45 has a sighting telescope 57 and is capable of distance-measuring a predetermined measuring point with high accuracy.

A recessed portion 48 is formed on a housing 47. A vertical rotation shaft 51 is rotatably mounted on the housing 47 via a bearing 49.

The vertical rotation shaft 51 has a horizontal axis 51a, one end portion is extended into the recessed portion 48 and a telescope unit 52 is fixed on the one end portion. On the other end of the vertical rotation shaft 51, a vertical angle encoder 53 is provided.

A vertical motor 54 is mounted on the vertical rotation shaft 51, the vertical rotation shaft 51 is rotated by the vertical motor 54, and by the rotation of the vertical rotation shaft 51, the telescope unit 52 is rotated around the horizontal axis as a center.

An elevation angle (vertical angle) of the telescope unit 52 is detected by the vertical angle encoder 53 and the detection result is inputted to a vertical angle control unit 55. Based on the detection result of the vertical angle encoder 53, the vertical angle control unit 55 calculates a vertical angle data of the telescope unit 52 and feedback-controls the vertical motor 54 based on the vertical angle data.

A description will be given on the telescope unit 52.

The telescope unit 52 comprises the sighting telescope 57 and incorporates a distance measuring unit (not shown). Since with respect to the distance measurement principle, the distance measuring unit is the same as the distance measuring unit 21 as shown in FIG. 1, a detailed description will be omitted.

A distance measuring optical axis of the sighting telescope 57 perpendicularly crosses the axis 51a and the axis 7a, and is set in such a manner that the axis 7a and the distance measuring optical axis exist within the same plane.

A display unit 58 and an operation input unit 59 are provided on the housing 47, and further, a main control unit 61, a third synchronization data generating unit 62 and a third storage unit 63 are incorporated.

An information and a data as necessary for the measurement are inputted from the operation input unit 59 to the main control unit 61. Input informations or measurement conditions or the like from the operation input unit 59 are displayed on the display unit 58. It is to be noted that the operation input unit 59 may be designed as a touch panel.

The main control unit 61 transmits a control signal corresponding to input information and data from the operation input unit 59 to the vertical angle control unit 55 and the telescope unit 52, and the control signal is transmitted to a horizontal angle control unit 12 via a connector 16.

The third synchronization data generating unit 62 outputs a third synchronization data for associating the measurement data as acquired by the sighting distance measuring unit 45 with the horizontal angle data as acquired by the horizontal rotating unit 3.

The vertical angle data as calculated by the vertical angle control unit 55 and the distance measurement data as measured by the telescope unit 52 are transmitted to the third storage unit 63 by a control signal from the main control unit 61. In the third storage unit 63, the vertical angle data and the distance measurement data are associated with the third synchronization data from the third synchronization data generating unit 62, and are stored.

The vertical angle data as outputted from the vertical angle control unit 55 indicates an elevation angle of the sighting telescope 57 in a condition where the sighting telescope 57 sights the measuring point and inputted to the third storage unit 63 via the vertical angle control unit 55.

The sighting distance measuring unit 45 performs distance measurement of the measuring point and the vertical angle under the condition where the predetermined measuring point is sighted by the sighting telescope 57. Therefore, in the sighting distance measuring unit 45, two-dimensional data (i.e. two-dimensional coordinates) of the measuring point can be acquired.

A description will be given below on an operation of the surveying instrument 1 of the second embodiment, which is constituted as a total station.

By a cooperative operation of a horizontal rotation of the horizontal rotating unit 3 and a vertical rotation of the telescope unit 52, the sighting telescope 57 is directed to the measuring point, and the predetermined measuring point is sighted by the sighting telescope 57. A distance measuring light is projected to the measuring point via the sighting telescope 57 and distance measurement of the measuring point is executed. Distance measurement data are inputted to the third storage unit 63 and are stored in the third storage unit 63.

Further, a vertical angle at the time when the measuring point is sighted, is detected by the vertical angle encoder 53 and the vertical angle control unit 55, the vertical angle control unit 55 associates the vertical angle data with the third synchronization data as outputted from the third synchronization data generating unit 62 and stores in the third storage unit 63.

The horizontal angle is detected by a horizontal angle encoder 11 and the horizontal angle control unit 12, the horizontal angle data are associated with a first synchronization data as outputted from a first synchronization data generating unit 13 and stored in a first storage unit 14.

A synchronization is performed between the first synchronization data and the third synchronization data by the main control unit 61, similarly to the first embodiment.

After the measurement, by associating the horizontal angle data as stored in the first storage unit 14 with the measurement data as stored in the third storage unit 63 based on the first synchronization data and the third synchronization data, the three-dimensional data (i.e. three-dimensional coordinates) of the measuring point can be acquired. Therefore, the surveying instrument 1 can perform the measurement as a total station.

Figure 3:
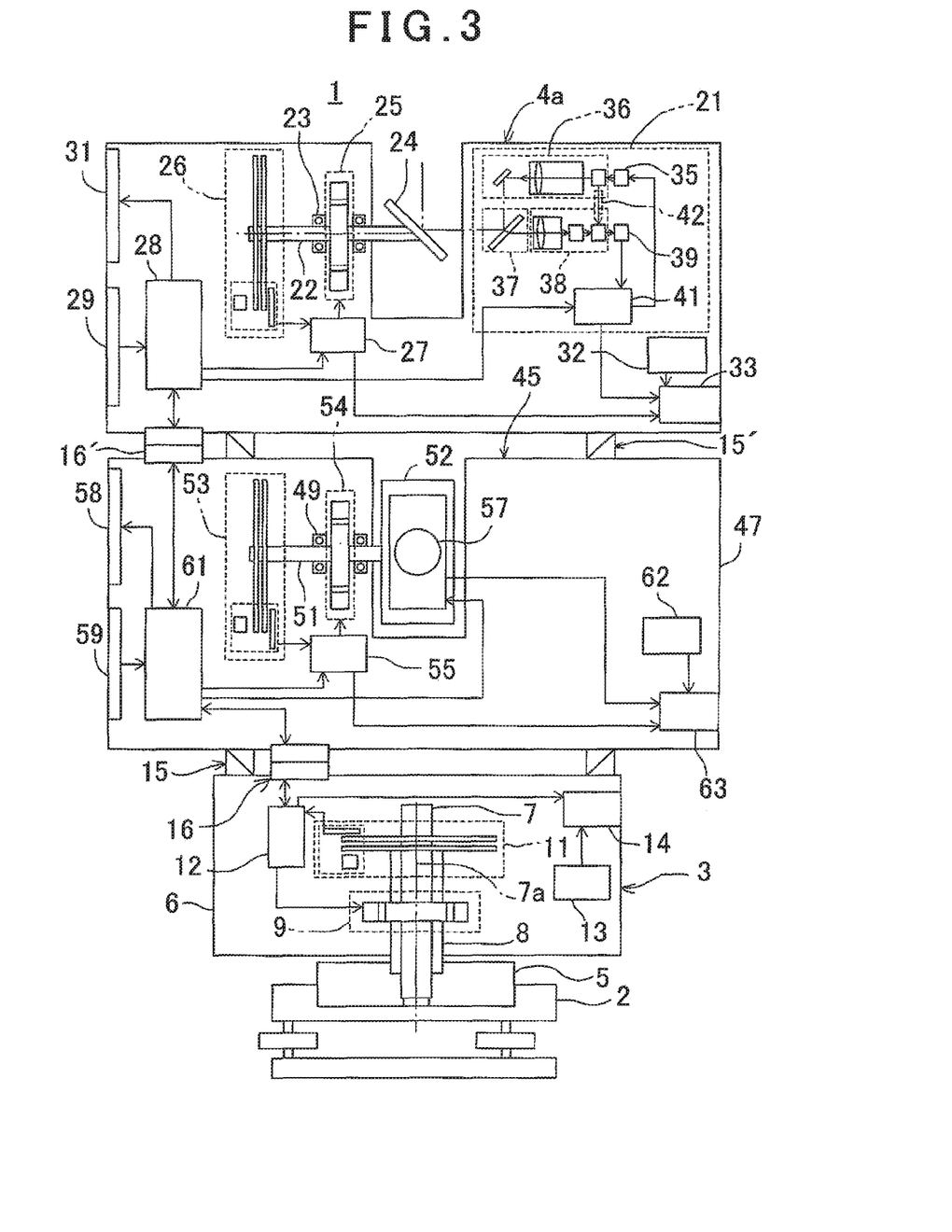
FIG. 3 is a schematical explanatory drawing of a surveying instrument according to a third embodiment of the present invention.

FIG. 3 shows a third embodiment.

The third embodiment shows a case where a surveying instrument 1 is constituted to have a function of a total station and a function of a laser scanner.

It is to be noted that in FIG. 3, what are equivalent to components as shown in FIG. 1 and FIG. 2 are referred by the same symbol, and detailed description thereof will be omitted.

A sighting distance measuring unit 45 is installed on an upper surface of a horizontal rotating unit 3 via a coupler 15. The horizontal rotating unit 3 and the sighting distance measuring unit 45 are electrically connected by a connector 16.

Further, a two-dimensional scanner unit 4a is installed on an upper surface of the sighting distance measuring unit 45 via a coupler 15'. The coupler 15' has the same structure as that of the coupler 15, the coupler 15' couples the sighting distance measuring unit 45 with the two-dimensional scanner unit 4a and also performs an alignment of the sighting distance measuring unit 45 and the two-dimensional scanner unit 4a. Further, the sighting distance measuring unit 45 and the two-dimensional scanner unit 4a are also electrically connected with each other by a connector 16'.

In the third embodiment, the sighting distance measuring unit 45 and the two-dimensional scanner unit 4a are selected and used, corresponding to a mode of measurement.

In a case where a predetermined measuring point is measured as a total station, the horizontal rotating unit 3 and the sighting distance measuring unit 45 are used.

A horizontal angle data as acquired by the horizontal rotating unit 3 is associated with a first synchronization data as acquired by a first synchronization data generating unit 13 and are stored in a first storage unit 14. Further, a measurement data (distance measurement data and vertical angle data) as acquired by the sighting distance measuring unit 45 are associated with a third synchronization data as outputted by a third synchronization data generating unit 62 and are stored in a third storage unit 63.

The horizontal angle data and the measurement data are converted to a three-dimensional data of the measuring point based on the first synchronization data and the third synchronization data.

Next, in a case where a measurement of an object to be measured is performed as a laser scanner, the horizontal rotating unit 3 and the two-dimensional scanner unit 4a are used.

The horizontal angle data as acquired by the horizontal rotating unit 3 are associated with the first synchronization data as acquired by the first synchronization data generating unit 13 and are stored in the first storage unit 14. Further, a two-dimensional point cloud data as acquired by the two-dimensional scanner unit 4a are associated with a second synchronization data as outputted by a second synchronization data generating unit 32 and are stored in a second storage unit 33.

The horizontal angle data and the two-dimensional point cloud data are converted to a three-dimensional point cloud data based on the first synchronization data and the second synchronization data.

Thus, by a single surveying instrument 1, a precise measurement of a predetermined point can be performed and a point cloud data of the object to be measured can be acquired.

Figure 4:
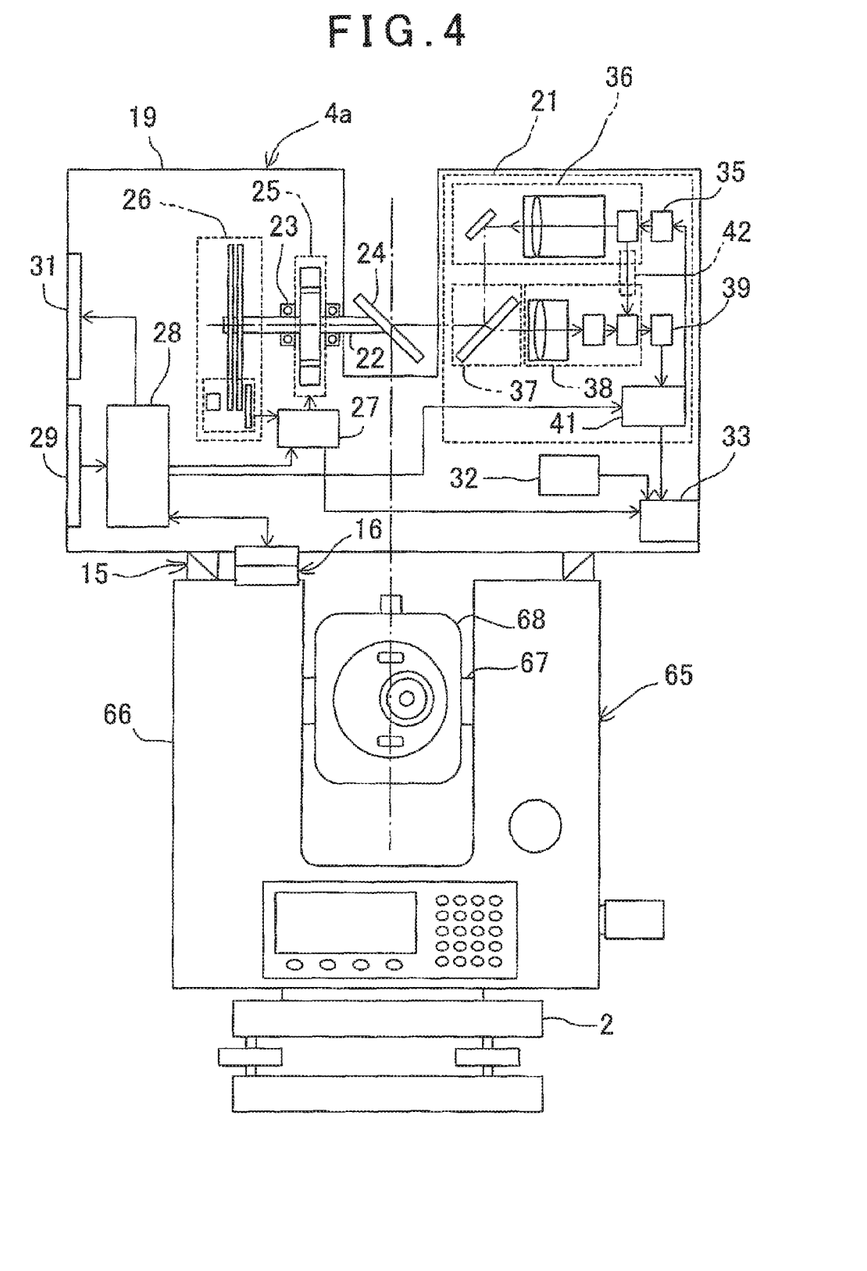
FIG. 4 is a schematical explanatory drawing of a surveying instrument according to a fourth embodiment of the present invention.

FIG. 4 shows a fourth embodiment. In FIG. 4, what are equivalent to components as shown in FIG. 1 are referred by the same symbol, and detailed description thereof will be omitted.

In the fourth embodiment, a case where a two-dimensional scanner unit 4a is installed on an existing total station 65, is shown.

The total station 65 comprises a frame unit 66, which can be rotated horizontally around a vertical axis as a center and a telescope unit 68, which is rotatably mounted in a vertical direction on the frame unit 66 around a vertical rotation shaft 67 as a center. That is, the total station 65 has a horizontal rotating mechanism unit (a horizontal rotating unit), and a vertical rotating mechanism unit.

Further, in the frame unit 66, control systems such as a main control unit, a storage unit, a synchronization data generating unit (none of these are shown in the figure) and the like are incorporated, and a distance measuring unit (not shown) is incorporated in the telescope unit 68.

On an upper surface of the total station 65 (i.e. the frame unit 66), a coupler 15 is provided and the two-dimensional scanner unit 4a is installed via the coupler 15. Under the condition where the two-dimensional scanner unit 4a is installed, a rotation axis (a vertical axis) in a horizontal direction of the total station 65 coincides with a mechanical axis of the two-dimensional scanner unit 4a.

The frame unit 66 corresponds to a horizontal rotating body 6 of a horizontal rotating unit 3 in FIG. 1, and the frame unit 66 and a driving unit (not shown) which rotate the frame unit 66 in a horizontal direction make up together a horizontal rotating unit.

Further, the two-dimensional scanner unit 4a is electrically connected with the total station 65 by a connector 16.

By being electrically connected the two-dimensional scanner unit 4a with the total station 65, a synchronization signal from a control circuit (not shown) as incorporated in the total station 65, is inputted to a main control unit 28.

Under a condition where the measurement of a predetermined point is performed by the total station 65, the two-dimensional scanner unit 4a is suspended.

In a case where the measurement is performed as a laser scanner, a fourth synchronization data are prepared based on a control signal as issued by a control circuit of the total station 65, the fourth synchronization data and a horizontal angle data as acquired by the total station 65 are associated, and are stored in a storage unit of the total station 65.

The two-dimensional scanner unit 4a acquires a two-dimensional point cloud data, and the point cloud data is associated with a second synchronization data as outputted by a second synchronization data generating unit 32 and the point cloud data and the second synchronization data are stored in a second storage unit 33.

The control signal from the total station 65 is inputted to the main control unit 28 via the connector 16 and synchronization is performed between the fourth synchronization data and the second synchronization data based on the control signal. Therefore, the horizontal angle data as acquired by the total station 65 and the two-dimensional point cloud data as acquired by the two-dimensional scanner unit 4a are converted to a three-dimensional point cloud data based on the fourth synchronization data and the second synchronization data.

Therefore, by installing the two-dimensional scanner unit 4a on the total station 65, a measurement can be performed as a three-dimensional scanner.

In the fourth embodiment, by using a horizontal driving mechanism of the existing total station, a three-dimensional scanner can be constituted by a two-dimensional scanner unit. As a result, it is possible to execute at lower cost compared with a case where a three-dimensional scanner as separately provided is used, and moreover, the total station and the three-dimensional scanner are integrated with each other, there is no need to handle individually, and contributes to an improvement of convenience.

It is to be noted that a camera is provided on a housing 19 of the two-dimensional scanner unit 4a or a camera, which photographs via a scanning mirror 24, is provided in the housing 19 and an image data as acquired by the camera, the vertical angle data at the time of image acquisition and the second synchronization data of the second synchronization data generating unit 32 are associated with each other and stored in the second storage unit 33. The horizontal angle data at the time of image data acquisition and the fourth synchronization data are associated with each other and are stored in a storage unit (not shown) of the total station 65. The data as stored in the storage unit of the total station 65 and the second storage unit 33 are transmitted to a PC (not shown), via a recording medium (not shown) or the like. Then, the PC can produce a panoramic image by combining the horizontal angle data and the vertical angle data and the image data based on the fourth synchronization data and the second synchronization data and can add color informations of RGB to each of the coordinates of a point cloud data, which is an assembly of a coordinate data, based on this panoramic image.

The invention claimed is:

1. A surveying instrument comprising; a horizontal rotating unit and a measuring unit installed on said horizontal rotating unit,
    wherein said horizontal rotating unit comprises a driving unit for rotating said measuring unit, a horizontal angle detector for measuring horizontal angle data, a first synchronization data generating unit, a first storage unit and a first control unit, wherein said first synchronization data generating unit outputs first synchronization data which indicate a timing at a time of acquisition of the horizontal angle data of said horizontal angle detector, said first control unit associates said horizontal angle data with said first synchronization data and stores in said first storage unit,
    wherein said measuring unit comprises a distance measuring unit for performing a distance measurement, a vertical angle detector for detecting a vertical angle at a time of distance measurement, a second synchronization data generating unit, a second storage unit and a second control unit, wherein said measuring unit acquires two-dimensional measurement data based on distance measurement data by said distance measuring unit and vertical angle data by said vertical angle detector, said second synchronization data generating unit outputs second synchronization data which indicate timings of a time of acquisition of said distance measurement data and a time of acquisition of said vertical angle data, said second control unit associates said two-dimensional measurement data with said second synchronization data and stores in said second storage unit, and said horizontal angle data and said two-dimensional measurement data can be converted to three-dimensional data based on said first synchronization data and said second synchronization data.

2. A surveying instrument according to claim 1, wherein each of said horizontal rotating unit and said measuring unit have GPS devices respectively, and said first synchronization data generating unit and said second synchronization data generating unit output said first synchronization data and said second synchronization data based on timing signals as obtained from said GSP devices.

3. A surveying instrument according to claim 2, wherein said measuring unit is a two-dimensional scanner unit, wherein said two-dimensional scanner unit comprises a distance measuring unit which emits a pulsed distance measuring light and performs a distance measurement for each of said pulsed distance measuring light, a scanning mirror to be provided on a vertical rotation shaft having a horizontal axis and for rotatably irradiating said pulsed distance measuring light, a motor for rotating said vertical rotation shaft and a vertical angle detector for detecting a vertical angle of said vertical rotation shaft, wherein said measuring unit is configured so as to acquire two-dimensional point cloud data based on a distance measurement result of said distance measuring unit and on a vertical angle at a time of distance measurement as detected by said vertical angle detector.

4. A surveying instrument according to claim 2, wherein said measuring unit is a sighting distance measuring unit, wherein said sighting distance measuring unit has a telescope unit capable of rotating in a vertical direction, a motor for rotating said telescope unit in a vertical direction, and a vertical angle detector for detecting a vertical angle of said telescope unit, wherein said telescope unit has a sighting telescope and a distance measuring unit, said distance measuring unit performs a distance measurement of a measuring point under a condition where a predetermined measuring point is sighted by said sighting telescope and said vertical angle detector measures a vertical angle of said sighting telescope under a sighted condition, wherein said measuring unit is configured so as to measure two-dimensional coordinates of said measuring point based on the distance measurement result and the vertical angle as detected.

5. A surveying instrument according to claim 1, wherein each of said first control unit and said second control unit respectively have clocks which issue timing signals for control signal, either one of said first control unit and said second control unit outputs the control signal to the other of said first control unit and said second control unit and said first synchronization data and said second synchronization data are adapted to be synchronized based on said control signal.

6. A surveying instrument according to claim 5, wherein said measuring unit is a two-dimensional scanner unit, wherein said two-dimensional scanner unit comprises a distance measuring unit which emits a pulsed distance measuring light and performs a distance measurement for each of said pulsed distance measuring light, a scanning mirror to be provided on a vertical rotation shaft having a horizontal axis and for rotatably irradiating said pulsed distance measuring light, a motor for rotating said vertical rotation shaft and a vertical angle detector for detecting a vertical angle of said vertical rotation shaft, wherein said measuring unit is configured so as to acquire two-dimensional point cloud data based on a distance measurement result of said distance measuring unit and on a vertical angle at a time of distance measurement as detected by said vertical angle detector.

7. A surveying instrument according to claim 5, wherein said measuring unit is a sighting distance measuring unit, wherein said sighting distance measuring unit has a telescope unit capable of rotating in a vertical direction, a motor for rotating said telescope unit in a vertical direction, and a vertical angle detector for detecting a vertical angle of said telescope unit, wherein said telescope unit has a sighting telescope and a distance measuring unit, said distance measuring unit performs a distance measurement of a measuring point under a condition where a predetermined measuring point is sighted by said sighting telescope and said vertical angle detector measures a vertical angle of said sighting telescope under a sighted condition, wherein said measuring unit is configured so as to measure two-dimensional coordinates of said measuring point based on the distance measurement result and the vertical angle as detected.

8. A surveying instrument according to claim 1, wherein said horizontal rotating unit has a leveling unit, said measuring unit has a tilt sensor for detecting tilting in two horizontal directions, and a mounting condition of said measuring unit with respect to said horizontal rotating unit is corrected so that said tilt sensor detects a horizontality under a condition where said horizontal rotating unit is leveled horizontally by said leveling unit.

9. A surveying instrument according to claim 8, wherein said measuring unit is a two-dimensional scanner unit, wherein said two-dimensional scanner unit comprises a distance measuring unit which emits a pulsed distance measuring light and performs a distance measurement for each of said pulsed distance measuring light, a scanning mirror to be provided on a vertical rotation shaft having a horizontal axis and for rotatably irradiating said pulsed distance measuring light, a motor for rotating said vertical rotation shaft and a vertical angle detector for detecting a vertical angle of said vertical rotation shaft, wherein said measuring unit is configured so as to acquire two-dimensional point cloud data based on a distance measurement result of said distance measuring unit and on a vertical angle at a time of distance measurement as detected by said vertical angle detector.

10. A surveying instrument according to claim 8, wherein said measuring unit is a sighting distance measuring unit, wherein said sighting distance measuring unit has a telescope unit capable of rotating in a vertical direction, a motor for rotating said telescope unit in a vertical direction, and a vertical angle detector for detecting a vertical angle of said telescope unit, wherein said telescope unit has a sighting telescope and a distance measuring unit, said distance measuring unit performs a distance measurement of a measuring point under a condition where a predetermined measuring point is sighted by said sighting telescope and said vertical angle detector measures a vertical angle of said sighting telescope under a sighted condition, wherein said measuring unit is configured so as to measure two-dimensional coordinates of said measuring point based on the distance measurement result and the vertical angle as detected.

11. A surveying instrument according to claim 1, wherein said measuring unit is a two-dimensional scanner unit, wherein said two-dimensional scanner unit comprises a distance measuring unit which emits a pulsed distance measuring light and performs a distance measurement for each of said pulsed distance measuring light, a scanning mirror to be provided on a vertical rotation shaft having a horizontal axis and for rotatably irradiating said pulsed distance measuring light, a motor for rotating said vertical rotation shaft and a vertical angle detector for detecting a vertical angle of said vertical rotation shaft, wherein said measuring unit is configured so as to acquire two-dimensional point cloud data based on a distance measurement result of said distance measuring unit and on a vertical angle at a time of distance measurement as detected by said vertical angle detector.

12. A surveying instrument according to claim 1, wherein said measuring unit is a sighting distance measuring unit, wherein said sighting distance measuring unit has a telescope unit capable of rotating in a vertical direction, a motor for rotating said telescope unit in a vertical direction, and a vertical angle detector for detecting a vertical angle of said telescope unit, wherein said telescope unit has a sighting telescope and a distance measuring unit, said distance measuring unit performs a distance measurement of a measuring point under a condition where a predetermined measuring point is sighted by said sighting telescope and said vertical angle detector measures a vertical angle of said sighting telescope under a sighted condition, wherein said measuring unit is configured so as to measure two-dimensional coordinates of said measuring point based on the distance measurement result and the vertical angle as detected.

13. A surveying instrument according to claim 1, wherein said measuring unit is a first measuring unit, and wherein said surveying instrument further comprises a second measuring unit provided on said first measuring unit;

wherein said first measuring unit is a sighting distance measuring unit having a telescope unit capable of rotating in a vertical direction, a motor for rotating said telescope unit in a vertical direction, and a vertical angle detector for detecting a vertical angle of said telescope unit, wherein said telescope unit has a sighting telescope and a distance measuring unit, said first distance measuring unit performs a distance measurement of a measuring point under a condition where a predetermined measuring point is sighted by said sighting telescope and said vertical angle detector measures a vertical angle of said sighting telescope under a sighted condition, wherein said first measuring unit is configured so as to measure two-dimensional coordinates of said measuring point based on the distance measurement result and the vertical angle as detected; and wherein said second measuring unit is a two-dimensional scanner unit comprising a distance measuring unit which emits a pulsed distance measuring light and performs a distance measurement for each of said pulsed distance measuring light, a scanning mirror to be provided on a vertical rotation shaft having a horizontal axis and for rotatably irradiating said pulsed distance measuring light, a motor for rotating said vertical rotation shaft and a vertical angle detector for detecting a vertical angle of said vertical rotation shaft, wherein said first measuring unit is configured so as to acquire two-dimensional point cloud data based on a distance measurement result of said distance measuring unit and on a vertical angle at a time of distance measurement as detected by said vertical angle detector.

14. A surveying instrument according to claim 1, wherein said horizontal rotating unit is a horizontal rotating mechanism unit as provided on a total station and a two-dimensional scanner unit is installed on said horizontal rotating mechanism unit, said two-dimensional scanner unit comprising a distance measuring unit which emits a pulsed distance measuring light and performs a distance measurement for each of said pulsed distance measuring light, a scanning mirror to be provided on a vertical rotation shaft having a horizontal axis and for rotatably irradiating said pulsed distance measuring light, a motor for rotating said vertical rotation shaft and a vertical angle detector for detecting a vertical angle of said vertical rotation shaft, wherein said measuring unit is configured so as to acquire two-dimensional point cloud data based on a distance measurement result of said distance measuring unit and on a vertical angle at a time of distance measurement as detected by said vertical angle detector.

* * * * *

UNITED STATES PATENT AND TRADEMARK OFFICE
CERTIFICATE OF CORRECTION

PATENT NO. : 9,909,871 B2
APPLICATION NO. : 15/158631
DATED : March 6, 2018
INVENTOR(S) : Kumagai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 112 days.

Signed and Sealed this

Twenty-fifth Day of September, 2018

Andrei Iancu
*Director of the United States Patent and Trademark Office*